United States Patent

Higgins et al.

[11] Patent Number: 5,849,351
[45] Date of Patent: Dec. 15, 1998

[54] WATER DISPERSIBLE COATING COMPOSITION FOR FAT-FRIED FOODS

[75] Inventors: Camille Higgins, Rockford; Jun Qian, Loves Park, both of Ill.; Kevin Williams, Beloit, Wis.

[73] Assignee: Kerry Ingredients, Inc., Beloit, Wis.

[21] Appl. No.: 855,668

[22] Filed: May 14, 1997

[51] Int. Cl.$^6$ .................................................. A23L 1/216
[52] U.S. Cl. ........................ 426/637; 426/102; 426/305; 426/438
[58] Field of Search .................................... 426/102, 305, 426/637, 438, 272

[56] References Cited

U.S. PATENT DOCUMENTS

| | | | |
|---|---|---|---|
| 3,424,591 | 1/1969 | Gold | 426/637 |
| 3,751,268 | 8/1973 | Van Patten et al. | 99/100 |
| 3,997,684 | 12/1976 | Willard | 426/550 |
| 4,551,340 | 11/1985 | El-Hag et al. | 426/437 |
| 5,004,616 | 4/1991 | Shanbhag et al. | 426/102 |
| 5,059,435 | 10/1991 | Sloan et al. | 426/102 |
| 5,141,759 | 8/1992 | Sloan et al. | 426/102 |
| 5,188,859 | 2/1993 | Lodge et al. | 426/560 |
| 5,302,410 | 4/1994 | Calder et al. | 426/637 |
| 5,622,741 | 4/1997 | Stubbs et al. | 426/243 |
| 5,648,110 | 7/1997 | Wu et al. | 426/102 |

*Primary Examiner*—Nina Bhat
*Attorney, Agent, or Firm*—Griffin, Butler, Whisenhunt & Szipl, LLP

[57] ABSTRACT

A water dispersible coating composition for fat-fried foods contains a starch, a dispersing agent, an acid salt and a leavening agent. The improvement is the use of a combination of at least one modified corn starch and rice flour, in respective weight proportions of about 10:1 to 1:1, as the starch. The composition may also contain a dextrin, e.g. tapioca dextrin, and a high amylose starch. The composition is dispersed in an aqueous medium having from about 20 to 80 weight percent of the composition for application to a food prior to fat frying.

10 Claims, No Drawings

WATER DISPERSIBLE COATING COMPOSITION FOR FAT-FRIED FOODS

The present invention relates to a water dispersible coating composition for fat-fried foods, and more particularly to a coating which is clear in appearance when on a fried food and which will substantially prolong the serving time of the fried food.

BACKGROUND OF THE INVENTION

A pernicious problem in the art is that of prolonging the serving time for fat-fried foods, and particularly deep fat-fried foods. The serving time after frying such food varies with the food, but generally speaking, the serving time is quite short. While the difficulties engendered with serving time differs somewhat from fried food to fried food, generally common to all of the fried foods is that with prolonged serving time, i.e. the time between frying and serving, the fried foods lose the desired texture. In fried chicken, for example, the chicken, after some prolonged time between frying and serving (serving time), e.g. 10 minutes, will have a somewhat oily and dry taste. Fried seafood, e.g. shrimp, scallops and the like, develop something of a soggy taste, texture and mouth feel with prolonged serving time. However, probably French fried potatoes deteriorate more rapidly with prolonged serving time than any other fried food. The deterioration causes the French fried potatoes to not only have an oily and dry taste, but the potatoes also become somewhat limp, as opposed to the fresh potato taste and crispness of the freshly fried potatoes.

The serving time becomes quite critical in many food preparation operations, for example, in fast food restaurants, institutional kitchens and the like. In fast food restaurants, in order to provide such fast service, it is necessary to prepare some of the foods prior to being ordered, and the serving time therefor becomes critical for customer satisfaction. In institutional kitchens and the like, there is always a time lag between preparation of the food and transportation of that food to the consumer.

The art has long struggled with methods, coatings and compositions for prolonging the serving time. These vary with the particular foods involved, but, generally, all of these approaches are toward some protective coating or treatment which will slow the deterioration of the texture and taste of the food after frying. French fried potatoes have been a very difficult problem for the art since certain coatings and the like may be relatively successful for other foods, but when applied to French fried potatoes, those coatings fall far short of desirability.

The reasons for loss of texture and taste of such fried foods have never been clear in the art. Some investigators have asserted that oil infusion into the fried foods is responsible, while others have asserted that loss of moisture from the fried foods is responsible. Most likely, both are responsible for the loss of texture and taste.

Generally speaking, the art has concentrated on water dispersible coating compositions for such fried foods which contain a starch, a dispersing agent, an acid salt and a leavening agent. The starch, during frying, is presumed to be converted to something of an oil and moisture barrier. The dispersing agent disperses the starch in an aqueous medium for applying the coating to the food, and the acid salt is used to prevent discoloration, particularly in regard to French fried potatoes, and to function as part of a leavening system. A leavening agent is used to provide a somewhat irregular surface to the fried food, so that the coated fried food does not have an unnatural slick and shiny appearance, and also contributes to the desired texture.

However, the prior art approaches have not been entirely satisfactory, especially for French fried potatoes, since it is quite common for French fried potatoes for use by fast food restaurants and institutional kitchens to be partially fried (parfried) in hot oil and then quick frozen for shipment to the user. This allows a very quick frying of the potatoes in hot oil by the user, e.g. a fast food restaurant. During the time period from parfrying and freezing by the manufacturer to refrying (finish frying) by the user, even in the frozen condition, there is opportunity for residual oil from the parfrying and moisture in the food to pass through the coating. Thus, when the refrying (finish frying) is achieved, by the ultimate user, there is already a certain amount of oil infusion and moisture loss associated with the potatoes, and the additional oil infusion into and the moisture loss from the potatoes during finish frying and during the serving time can make the serving time quite short. Similar parfrying and freezing takes place with other foods designed for fast food restaurants and institutional use, e.g. chicken, seafood, etc.

In U.S. Pat. No. 3,424,591, issued on Jan. 28, 1969, it is pointed out that potatoes have a variable chemical and physical composition, e.g. the amount of reducing sugars, moisture, solids, protein, carbohydrate, etc., and that a sugar, such as dextrose or glucose, is often used in coatings for the potatoes to avoid the affects of some of that variation by providing a richer color to the fried potatoes. It is also pointed out that calcium lactate can be used as a stiffening agent to improve the physical appearance and plate life (serving time). To avoid these problems, that patent suggests treating the potatoes with a chemically modified natural hydrocolloid to form a thin coating or film on the potato surface prior to deep fat frying. Particularly recommended is alkyl cellulose ether as the hydrocolloid, and particularly those which form thermally reversible gels in aqueous solution, such as methyl cellulose.

U.S. Pat. No. 3,751,268, issued on Aug. 7, 1973, recognizes the same problem with serving time of French fried potatoes and points out that prior attempts include coating the potatoes before frying with gelatinized starch solution of either a modified or unmodified starch, but that practice has proved ineffective. The patent suggests coating the potatoes with ungelatinized unmodified high amylose starch having an amylose content above 50%. In this regard, the patent points out that it is intended that the starches have a pure amylose content of more than 50% and which have undergone no physical or chemical treatment to change the properties of the refined native starch.

U.S. Pat. No. 4,551,340, issued on Nov. 5, 1985, again addresses the problem of French fried potatoes and suggests that the potatoes be wetted with an aqueous suspension of a film-forming hydrocolloid, glucose polymer, most preferable potato starch, which has not been pregelatinized. It is said that that hydrocolloid film functions not only to minimize oil absorption but also to control moisture loss during frying and in oven reheating.

U.S. Pat. No. 5,004,616, issued on Apr. 2, 1991, describes a process for preparing improved French fried potatoes for subsequent reheating in a microwave oven where the potatoes are toasted with potato granules to provide a thin coating of toasted potato granules which adheres to the surface of the potato strips. After the potato strips are blanched (described more fully hereinafter), the potatoes are dust coated with the potato granules. Here again, the protective coating is a potato starch.

U.S. Pat. No. 5,059,435, issued Oct. 22, 1991, addresses the same problem and reviews the prior art in connection with the coatings. Particularly, that patent addresses the ungelatinized modified high amylose starch described in U.S. Pat. No. 3,751,268, discussed above, but suggests a different coating. The patent suggests a coating comprising a combination of chemically modified ungelatinized potato starch, chemically modified ungelatinized corn starch, and rice flour. It is stated in that patent that the potato starch in the composition is necessary as a major component of the starch to produce optimal results. Particularly, it is said that raw potato starch which has been modified through known chemical cross-linking processes produces an optimal coating, since it minimizes sticking or clumping of the strips during processing and coats the potato strips evenly. It is further said that the combination of the ungelatinized potato starch, modified ungelatinized corn starch, and rice flour is important, since the potato starch and corn starch contribute crispness to the coating since they are not gelatinized prior to parfrying, and the rice flour provides tenderness to the finished product.

U.S. Pat. No. 5,302,410, issued on Apr. 12, 1994, reports that the prior approaches for French fried potatoes by using gums, high amylose starches and other hydrocolloids have not fulfilled expectations and suggests coating the potatoes before parfrying with an aqueous solution of the hydrolyzed starch product such as dextrin or maltodextrin.

U.S. Pat. No. 5,393,552, issued on Feb. 28, 1995, is a continuation-in-part of U.S. Pat. No. 5,302,410 and suggests the same coating but used in a variation of the process.

Accordingly, the art has long struggled toward providing an acceptable coating for fat-fried foods, especially deep fat-fried foods, which will prolong the serving time, but as the prior art discussed above illustrates, the art has not produced a satisfactory coating, and many different approaches have been used in efforts to solve the problem of prolonged serving time. It would, therefore, be of distinct advantage to the art to provide a coating for fried foods, particularly French fried potatoes, which allows a much longer serving time while yet retaining the fresh fried appearance, texture and taste.

SUMMARY OF THE INVENTION

It has now been discovered that a water dispersible coating composition for fat-fried foods may be provided which is, in effect, an improvement over prior art coatings. As noted above, those prior art coatings, generally, comprise a starch, a dispersing agent, an acid salt and a leavening agent. Also, as the above-discussed prior art illustrates, the art has suggested many different starches or other hydrocolloid agents as the basic ingredient of the coating composition.

The present improvement is based on the discovery that if the starch in that conventional composition is a combination of at least one modified corn starch and rice flour in certain weight proportions, the serving time can be substantially prolonged. In addition, it has been discovered that such a coating is clear on the fried food, especially potatoes, so that the coating does not obscure the natural appearance of the food. Indeed, with the present coating, the usual consumer would not be able to detect the presence of the coating by either sight, taste or texture.

It has also been discovered that, to provide a coating with such characteristic, the weight proportion of the at least one corn starch to rice flour can range from about 10:1 to 1:1, but is more preferably from about 10:1 to 4:1.

It has also been found that other ingredients may be added to the present coating composition to provide other advantages, including the use of a dextrin, e.g. tapioca dextrin, and the use of a high amylose starch in the coating composition.

DESCRIPTION OF PREFERRED EMBODIMENTS

As noted above, the starch in the present composition is a combination of at least one modified corn starch and rice flour. Modified corn starch and rice flour are standard commercial ingredients and may be obtained from a variety of suppliers. Corn starch is commercially modified by known cross-linking and chemical substitution processes, such as to produce acid hydrolyzed, phosphate modified and hydroxyalkyl substituted starches. However, these processes result in some differences in the modified corn starch from manufacturer to manufacturer and from time-to-time, which can introduce variability to the modified corn starch and the present coating. It has been found that, if commercially available modified corn starches are blended, a more balanced and uniform coating results. Hence, the modified corn starch of the present invention is at least one modified corn starch, but preferably is a blend of more than one commercially available modified corn starch, e.g. two or three or four or more.

The modified corn starch will always predominate in proportions to the rice flour, since the modified corn starch is the primary texture enhancing ingredient of the coating composition. However, the rice flour is equally important in that the rice flour, in combination with the modified corn starch, ensures that the coating will not only be clear so that the coating is virtually visually undetectable by the consumer, but also tenderizes the coating so as to make the coating on the fried food essentially undetectable from a texture point of view. It has been found that if modified corn starch alone is used, then the coating is less clear and the texture of the coating on the fried food is more crunchy than a natural French fried potato and can be detected by consumers. However, with the addition of the rice flour, the coating becomes clear and far less crunchy, and with the rice flour in combination with the modified corn starch, the coating is virtually undetectable by the consumer. It is, of course, important that the coating not be detectable, since the consuming public would object to a coating that provides either an appearance, taste or texture different from the natural (uncoated) French fried potato.

While weight proportions of the modified corn starch to the rice flour can vary between about 10:1 and 1:1, as noted above, it is preferable that the weight proportions are between about 10:1 to 4:1, i.e. with a greater amount of rice flour than the 1:1 proportion. An amount of rice flour up to a ratio of 4:1 still provides quite adequate film formation for prolonged serving time, but up to that ratio, the rice flour provides a texture to the coating on the fried potato which is virtually undetectable from a texture point of view, while still providing the retained texture. There is some trade-off in prolonged serving time at higher ratios of rice flour, but with up to a 4:1 ratio of modified corn starch to rice flour the serving time is still acceptable.

The dispersing agents can be those conventionally used in the art, e.g. gums, hydrocolloids and the like, for example, guar gum, the celluloses, etc., and the dispersing agent is not critical, since it merely functions to disperse the composition in an aqueous medium for applying to the food. However, it is preferable that xanthan gum be used in this regard, since it has been found that xanthan gum functions as a very good dispersing agent but imparts no detectable presence in the fried coating.

A acid salt is normally used in these compositions, such as sodium acid pyrophosphate (SAPP), although other acid salts and other phosphates may be used. As noted above, these salts improve texture during prolonged serving time.

Also, as is conventional in these compositions, a leavening agent is used so that the appearance of the coating is not slick or shiny, and it also contributes to the crispy texture. Conventional leavening agents, such as monocalcium phosphate, may be used, but a preferred leavening agent is a combination of the acid salt and a gas-producing basic salt, such as sodium bicarbonate. However, other carbonates or other leavening agents may be used.

The composition may also contain a dextrin which is used to assist in form formation. Tapioca dextrin is particularly useful in this regard. When a dextrin is used, the dextrin will normally be in a weight proportion to the corn starch of from 15:1 to 7:1.

The composition may also contain a high amylose starch. The high amylose starch affects texture and is therefor useful in the composition. When a high amylose starch is used, the weight proportion to the corn starch will be from about 15:1 to 10:1. The amylose content of the high amylose starch should be at least 60% but more preferably about 70% or greater.

A very small amount of vegetable oil can also be used in the composition, primarily, for controlling the dust of the composition during use and handling.

The composition may also contain preservatives, tints and the like, which are common in the art. The composition may also have other flavoring agents, such as salt, spices and the like.

The composition may be prepared for direct use by dispersing in an aqueous medium, e.g. water, having from 20 to 80 weight percent of the composition in the aqueous medium.

In a preferred embodiment, the composition will contain all of the at least one modified corn starch, the rice flour, the tapioca dextrin, the high amylose starch, a leavening agent or agents, a dispersing agent, e.g. xanthan gum, and the vegetable oil. In that most preferred composition, as a percentage of the dry composition, the modified corn starches will be 45–85%, the rice flour will be 5–20%, the tapioca dextrin will be 5–15%, the high amylose starch will be 2–7%, the dispersing agent, e.g. xanthan gum, will be 0.5–0.3% and vegetable oil will be 0.5 to 0.15%. The leavening most preferably is a combination of the leavening agent and the SAPP, e.g. a combination of SAPP, and monocalcium phosphate or sodium bicarbonate, where, respectively, the range will be 0.51–0.2% and 0.7–1.4%.

In using the composition, all of the above dry ingredients are dry blended to make a homogenous mixture thereof. The dry ingredients are then mixed with water to the desired concentrations of solids, e.g. from about 20% to 80% by weight of solids in the composition. However, more usually that solids content will be between about 30% and 70%, and more desirably between about 30% and 60%. Any usual dispersing apparatus, such as a LIGHTNING mixer, is suitable in this regard.

The food, e.g. vegetables, potatoes, chicken, meat, seafood, is prepared in the usual manner. For example, with potatoes, the potatoes are washed, scrubbed, peeled and cut into strips, which is common to the art. The strips are then usually blanched, in a conventional manner. The potatoes are then dried and placed in an aqueous solution containing a darkening preventive material, such as sodium acid pyrophosphate (SAPP). That solution may also contain salt and dextrose for providing a golden color to the potatoes. The potatoes are then placed on a tray and oven dried and, after drying, passed through an aqueous waterfall containing the suspension of the coating composition. After passing through the waterfall, the strips are placed in an open kettle fryer containing vegetable oil at conventional temperatures, e.g. about 340° F. to about 400° F. The length of time in the fryer depends upon whether the food, e.g. potatoes, is to be completely fried or simply parfried. Parfrying is where the food is partially fried in order to preserve the food, and then the food is frozen for subsequent reheating (also called finish frying).

The invention will now be illustrated by the following Examples. In the Examples, as well as the specification and claims, all percentages and ratios are by weight, unless otherwise indicated.

EXAMPLE 1

Raw Russett-Burbank potatoes from the Washington/Idaho area were washed, scrubbed, peeled and cut into strips having a 5/16 inch square cross-section.

The strips were blanched in 170° F. water for six minutes. They were drained and placed in a warm aqueous solution (100° F.) containing 0.5% sodium acid pyrophosphate (SAPP) and 3.0% salt (NaCl) for 30 seconds. Then they were placed on a tray and oven dried for 10 minutes at 180°–190° F. to reach approximately a target reduction in weight (moisture loss) of 15%. After drying, they were passed under an aqueous waterfall containing the following suspension of dry ingredients at an overall concentration of 40%:

| Ingredient | Weight % |
| --- | --- |
| Blend of Modified Corn Starches (National Starch 6997:118 (35%); Purecote B790 (17%) and Puregel B992 (17%) - Grain Processing Corp.) | 69 |
| Rice Flour | 16 |
| Tapioca Dextrin | 7.5 |
| High-amylose Starch | 5.0 |
| SAPP 40 | 1.1 |
| Sodium Bicarbonate | 0.8 |
| Xanthan Gum | 0.15 |
| Vegetable Oil | 0.10 |
| Natural Flavor | 0.35 |

The suspension was prepared by preblending 400 grams of the dry ingredients, then adding 600 grams of water to the dry ingredients and stirring until the coating was homogeneous.

After passing through the waterfall, the strips were placed in an open-kettle fryer containing vegetable oil at a temperature of 380° F. The coating was set and the potatoes were parfried by this process after a 40-second fry time. The strips were then flash frozen by placing the strips in a freezer at −30° F. for one to two hours. They were then packaged for finish frying at a later time.

Finish frying consisted of frying the parfried strips at a temperature of 350° F. for 2.5 minutes in vegetable oil.

To test the effect of heat-lamp stability for prolonged serving times, the fries were placed 18 inches below a 250-watt infrared heat lamp for 10 minutes and evaluated instrumentally and hedonically.

Instrumental evaluation consisted of a three-point bend test using a Stable Microsystems' TAXT2 texture analyzer. Five French fries were placed across a pair of support bars 2 mm thick and 42 mm apart. A chisel-tipped guillotine 2 mm thick and 70 mm wide was directed at the center of the gap between the bars supporting the fries. Data describing the distance of the guillotine and the forces it encountered were collected at a rate of 200 points per second during transit. An average of five replicate runs showed that fries coated with the composition described above produce a high, sharp peak in contrast to fries prepared in the same manner but uncoated.

Sensory evaluations included a test similar to the three-point bend test above. A French fry was grasped between the thumb and forefinger of one hand. The forefinger of the other hand was used to bend the French fry around the forefinger of the grasping hand. The quality of the break was noted as a range between crisp and limp.

Crunchiness during mastication was also an indicator of the quality of the coating. The qualities monitored in that context were the degree of leathery, crispy and softness characteristics.

Surface appearance of the fries was between smooth and somewhat blistered. The coating was clear and undetectable either visually or upon mastication.

EXAMPLE 2

The same procedure of Example 1 was followed, with the exception that the composition of the coating was as follows:

| Ingredient | Weight % |
|---|---|
| Blend of Modified Corn Starches (National Starch 6997:118; Purecote B790; and Puregel B992; all in the same proportions as Example 1) | 80.0 |
| Rice Flour | 12.5 |
| High-amylose Starch | 5.0 |
| SAPP 40 | 0.5 |

| Ingredient | Weight % |
|---|---|
| Monocalcium ® Phosphate | 0.5 |
| Sodium Bicarbonate | 1.24 |
| Xanthan Gum | 0.15 |
| Vegetable Oil | 0.10 |
| Natural Flavor | 0.01 |

Essentially the same results as that of Example 1 were obtained.

What is claimed is:

1. In a water dispersible coating composition for fat-fried foods, wherein the coating composition comprises a starch, a dispersing agent, an acid salt and a leavening agent, the improvement wherein the starch consists essentially of a combination of a blend of more than one modified corn starch and rice flour in respective weight proportions of about 10:1 to 1:1.

2. The composition of claim 1, wherein the weight proportions are about 10:1 to 4:1.

3. The composition of claim 1, wherein the composition also contains a dextrin.

4. The composition of claim 3, wherein the dextrin is tapioca dextrin.

5. The composition of claim 3, wherein the dextrin is in a weight proportion to the corn starch of from about 15:1 to 7:1.

6. The composition of claim 1, wherein the composition also contains a high amylose starch.

7. The composition of claim 6, wherein the high amylose starch is in a weight proportion to the corn starch of from about 15:1 to 10:1.

8. The composition of claim 1, wherein the composition is dispersed in an aqueous medium having from about 20 to 80 weight percent of the composition in the aqueous medium.

9. The composition of claim 8, wherein the composition in the aqueous medium is from about 30% to 60%.

10. The composition of claim 1, wherein the composition is disposed on a French fried potato.

* * * * *